US008308138B1

(12) United States Patent
Jordan et al.

(10) Patent No.: US 8,308,138 B1
(45) Date of Patent: Nov. 13, 2012

(54) WIRE PULLER AND CONDUIT ADAPTER

(75) Inventors: Michael C. Jordan, Knoxville, TN (US); David S. Jordan, Knoxville, TN (US)

(73) Assignee: Southwire Company, Carrollton, GA (US)

( * ) Notice: Subject to any disclaimer, the term of this patent is extended or adjusted under 35 U.S.C. 154(b) by 0 days.

(21) Appl. No.: 13/208,497

(22) Filed: Aug. 12, 2011

Related U.S. Application Data

(63) Continuation of application No. 11/679,795, filed on Feb. 27, 2007, now Pat. No. 8,016,267.

(60) Provisional application No. 60/777,620, filed on Feb. 28, 2006, provisional application No. 60/777,347, filed on Feb. 28, 2006.

(51) Int. Cl.
*H02G 1/08* (2006.01)

(52) U.S. Cl. .................. 254/134.3 FT; 254/134.3 R

(58) Field of Classification Search .............. 226/193; 254/134.3 R, 134.3 FT, 389
See application file for complete search history.

(56) References Cited

U.S. PATENT DOCUMENTS

| | | | | |
|---|---|---|---|---|
| 307,986 A | * | 11/1884 | Porritt | 254/398 |
| 2,190,880 A | * | 2/1940 | Moss | 254/389 |
| 2,489,319 A | | 11/1949 | Nave et al. | |
| 2,948,510 A | * | 8/1960 | Kieser | 254/326 |
| 3,072,382 A | * | 1/1963 | Jones | 254/134.3 FT |
| 3,185,399 A | | 5/1965 | Pellicciotti | |
| 3,190,616 A | * | 6/1965 | Oleson | 254/134.3 FT |
| 3,223,384 A | * | 12/1965 | Gebo | 254/134.3 FT |
| 3,224,733 A | * | 12/1965 | Ensley | 254/134.3 R |
| 3,610,582 A | | 10/1971 | Passoni | |
| 3,968,952 A | * | 7/1976 | Newell | 254/134.3 R |
| 3,985,188 A | | 10/1976 | Steele | |
| 4,196,864 A | | 4/1980 | Cole | |
| 4,270,734 A | | 6/1981 | Straight | |
| 4,290,584 A | | 9/1981 | Eckels et al. | |
| 4,456,225 A | * | 6/1984 | Lucas | 254/134.3 FT |
| 4,497,470 A | * | 2/1985 | Carter et al. | 254/134.3 FT |
| 4,796,865 A | * | 1/1989 | Marchetti | 254/134.3 FT |
| 4,951,890 A | | 8/1990 | Sossamon | |
| 4,956,889 A | | 9/1990 | Kirk | |
| 5,149,056 A | | 9/1992 | Jones | |
| 5,277,350 A | | 1/1994 | Thornbury, Jr. | |
| 5,322,397 A | | 6/1994 | Spear | |
| 5,376,035 A | | 12/1994 | Forrest | |
| 5,509,489 A | | 4/1996 | Lower, Jr. | |
| 5,593,140 A | | 1/1997 | van Beers | |
| 5,645,265 A | * | 7/1997 | Shu | 254/134.3 FT |
| 5,820,317 A | | 10/1998 | Van Troba | |

(Continued)

OTHER PUBLICATIONS

Greenlee Ultra Tugger 5 product literature. Greenlee Catalog 2007.

(Continued)

*Primary Examiner* — Lee D Wilson
*Assistant Examiner* — Jamal Daniel
(74) *Attorney, Agent, or Firm* — Hope Baldauff Hartman, LLC

(57) ABSTRACT

Concepts and technologies are disclosed herein for wire pullers and conduit adapters. According to various embodiments, a wire puller includes first and second positionable arms. The wire puller also can include an adapter and adapter bracket. In some embodiments, the adapter and adapter bracket are configured to allow easier pulling of wire through conduit. Some embodiments of the wire puller are configured to allow for easier set up and use compared to existing wire pullers. Some embodiments of the wire pullers also are configured to provide increased pulling force over existing wire pullers.

19 Claims, 11 Drawing Sheets

U.S. PATENT DOCUMENTS

| | | | |
|---|---|---|---|
| 5,863,160 A | | 1/1999 | Havener |
| 5,885,036 A | | 3/1999 | Wheeler |
| 5,984,273 A | * | 11/1999 | Ray .................... 254/134.3 R |
| 6,286,815 B1 | * | 9/2001 | Ray .................... 254/134.3 R |
| 6,431,524 B1 | * | 8/2002 | Weber .............. 254/134.3 FT |
| 6,682,050 B1 | * | 1/2004 | Ray .................... 254/134.3 R |
| 6,769,669 B2 | * | 8/2004 | Cook et al. .................. 254/329 |
| 7,070,168 B2 | * | 7/2006 | Plummer .......... 254/134.3 FT |
| 7,216,848 B2 | * | 5/2007 | Plummer .......... 254/134.3 FT |
| 7,712,726 B1 | * | 5/2010 | Jernigan ........... 254/134.3 FT |
| 8,016,267 B2 | * | 9/2011 | Jordan et al. ..... 254/134.3 FT |
| 2002/0043657 A1 | * | 4/2002 | Ray ................. 254/134.3 FT |
| 2003/0075711 A1 | * | 4/2003 | Cook et al. ....... 254/134.3 FT |
| 2003/0098450 A1 | * | 5/2003 | Cook et al. ......... 254/134.3 R |
| 2005/0051759 A1 | * | 3/2005 | Plummer .......... 254/134.3 FT |
| 2005/0204967 A1 | | 9/2005 | Wrinkle |
| 2007/0034845 A1 | * | 2/2007 | Plummer .......... 254/134.3 FT |
| 2007/0221896 A1 | * | 9/2007 | Jordan et al. ..... 254/134.3 FT |
| 2007/0284559 A1 | * | 12/2007 | Plummer .......... 254/134.3 FT |
| 2008/0224108 A1 | * | 9/2008 | O'Connor ............... 254/134.5 |
| 2009/0078921 A1 | * | 3/2009 | Plummer .......... 254/134.3 FT |

OTHER PUBLICATIONS

Greenlee Ultra Tugger 8 product literature. Greenlee Catalog 2007.
U.S. Official Action dated Jul. 2, 2010 in U.S. Appl. No. 11/679,795.
U.S. Official Action dated Nov. 23, 2010 in U.S. Appl. No. 11/679,795.
U.S. Notice of Allowance dated Apr. 29, 2011 in U.S. Appl. No. 11/679,795.

* cited by examiner

WIRE PULLER AND CONDUIT ADAPTER

CROSS REFERENCE TO RELATED APPLICATION

This patent application is a continuation of and claims priority to U.S. patent application Ser. No. 11/679,795 now U.S. Pat. No. 8,016,267, entitled "Wire Puller and Conduit Adapter," filed Feb. 27, 2007, now U.S. Pat. No. 8,016,267, which claims the benefit of U.S. Provisional Application No. 60/777,620, filed Feb. 28, 2006 and U.S. Provisional Application No. 60/777,347, filed Feb. 28, 2006. U.S. patent application Ser. No. 11/679,795, U.S. Provisional Application No. 60/777,620, and U.S. Provisional Application No. 60/777,347 are hereby incorporated by reference in its entireties.

TECHNICAL FIELD

The present disclosure relates to installing wires in conduit. More specifically, the present disclosure relates to a machine for pulling wires and the like through conduit.

BACKGROUND

Many structures utilize electrical wire and various types of cables to provide electricity, communications, and the like. These wires and cables are frequently installed in conduits, such as plastic or metal tubes. Conduits are often installed into the walls, ceiling, and floors of a building while the building is being constructed, and wires and cables are then installed into the conduits after the framework of the building is sufficiently complete.

Typically, a light and flexible line or cord or fish tape is threaded through the conduit so as to extend out of both ends of the conduit. The light line or fish tape is then used to pull a heavier line through the conduit. A line which is strong enough to pull the desired wire or cable through the conduit is used. The wire is then attached to an end of the pulling line and the line is used to pull the wire through the conduit.

It will be appreciated that while it may be relatively easy to pull a wire through a short straight section of conduit, it becomes increasingly difficult to pull a wire through a conduit as the conduit becomes longer or contains more bends. Additionally, thicker wires and cables are more difficult to pull through conduit than thinner ones. Thus, a point is reached where a person is simply not strong enough to pull the desired wire or cable through the conduit.

Mechanical wire pullers have been utilized to pull the desired wires through a conduit. Existing wire pullers, however, suffer from many limitations. Many wire pullers use a motor to pull the pulling line and wire through the conduit, but require the operator to stabilize the wire puller itself. If high force is required to pull the wire through the conduit, the operator may not be able to stabilize the wire puller. Existing wire pullers may not supply sufficient force to pull a large wire through a conduit, or to pull a wire through a long section of conduit. Existing wire pullers are typically limited as to their ability to easily pull wires from various locations such as from a ceiling or wall as the wire puller may be too small and lack sufficient adjustability to reach a desired location. Existing wire pullers are also inconvenient to transport, set up, and adjust during use.

There is thus a need for a wire puller which overcomes the above and other limitations of available wire pullers. Such a wire puller should be capable of pulling large wires and cables where a high pulling force is required. Such a wire puller should be easy to transport and easy to set up and use. Such a wire puller should also be adjustable so as to allow a user to pull wires from many locations, such as from a floor, wall, or ceiling.

SUMMARY

It is an object of the concepts and technologies disclosed herein to provide an improved wire puller and conduit adapter. According to one aspect of the concepts and technologies disclosed herein, a wire puller is provided which is easy to transport. The wire puller may be mounted to a cart or have wheels attached thereto to as to allow a person to roll the wire puller into place. The wire puller may also be designed so as to be collapsible for ease of transportation.

According to another aspect of the concepts and technologies disclosed herein, a wire puller is provided which is adjustable so as to allow a user to pull wires from a variety of locations. The wire puller may be constructed with a first arm extending from the base and a second arm extending from the first arm. The arms are typically pivotably mounted to the base and to each other so as to allow the arms to be properly positioned for a variety of wire pulls. According to another aspect of the concepts and technologies disclosed herein, the first and second arms may be constructed so as to be telescoping, or so as to bend in the middle of the arm, allowing greater flexibility during use and easier storage and transportation.

According to another aspect of the concepts and technologies disclosed herein, a wire puller may be provided which attaches to the conduit. Attachment to the conduit braces the wire puller to allow for higher pulling forces. An adapter may be provided which allows the wire puller to be attached to a conduit having a pulling line, wire, or cable extending therefrom without threading the line or wire through the adapter. An adapter may be provided which threads onto the end of a conduit or is placed inside of a conduit so as to maintain the adapter and wire puller in rigid connection with the conduit.

These and other aspects of the concepts and technologies disclosed herein are realized in a wire puller as shown and described in the following figures and related description.

BRIEF DESCRIPTION OF THE DRAWINGS

Various embodiments of the concepts and technologies disclosed herein are shown and described in reference to the numbered drawings wherein.

It will be appreciated that the drawings are illustrative and not limiting of the scope of the various embodiments of the concepts and technologies disclosed herein, which is defined by the appended claims. The various elements of the embodiments of the concepts and technologies disclosed herein accomplish various aspects and objects of the concepts and technologies disclosed herein. It is appreciated that not every element of the various embodiments of the concepts and technologies disclosed herein can be clearly displayed in a single drawing, and as such not every drawing shows each element of the embodiments of the concepts and technologies disclosed herein.

DETAILED DESCRIPTION

The drawings will now be discussed in reference to the numerals provided therein so as to enable one skilled in the art to practice the concepts and technologies disclosed herein. The drawings and descriptions are exemplary of various aspects of the disclosed embodiments of the concepts and technologies disclosed herein and are not intended to narrow the scope of the appended claims.

Figure 1:
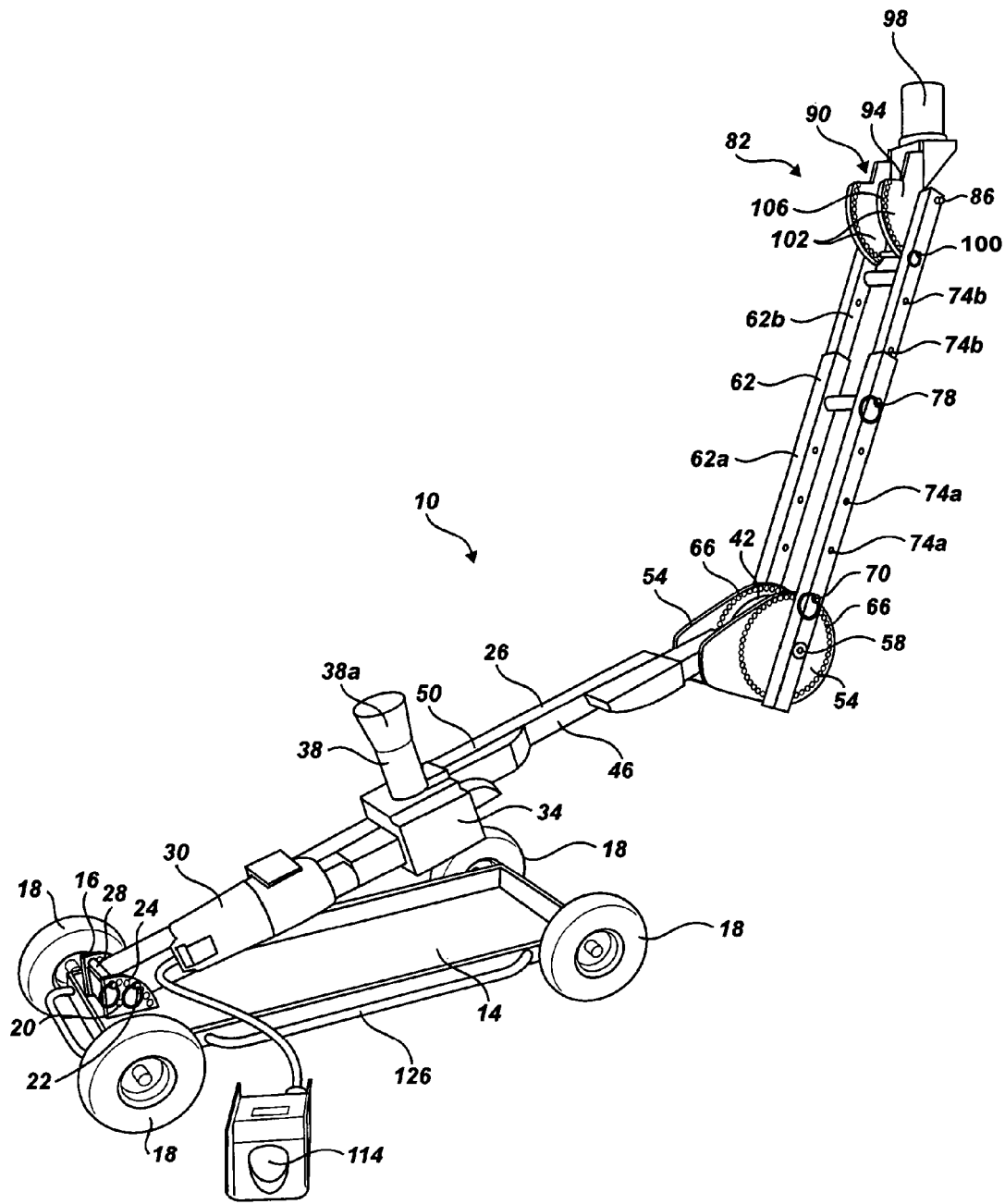
FIG. 1 shows a perspective view of a wire puller according to an illustrative embodiment.

Turning to FIG. 1, a perspective view of a wire puller, indicated generally at 10, is shown. The wire puller 10 includes a base 14 having wheels 18. The base 14 may include a storage container (not shown) for storing tools or accessories used in combination with the wire puller 10, if such is desired. A first arm 26 is attached to the base 14. The first arm 26 provides a mounting location for a motor 30, transmission 34 and capstan 38, and pulley 42. The motor 30 may be a simple motor, or may include a gearbox portion, such as where a drill motor is used. The motor 30 may even be removably mounted to the first arm 26. The capstan 38 may include a knurled portion 38a to allow an operator to more easily pull wires which require a large pulling force. The capstan 38 is placed in a vertical orientation instead of the horizontal output shaft commonly used by prior art wire pullers. Orienting the capstan 38 vertically can allow an operator to stand to the side of the wire puller 10 while operating the wire puller 10. Such an arrangement can be preferable to a horizontal output shaft as used in prior art wire pullers, which may require the operator to stand behind the wire puller where the operator is in line with the pulling rope. In such a position, it is likely that the pulling rope would strike the operator if the rope were to break.

The first arm 26 is typically pivotably attached to the base 14 and selectively locked into place at a variety of angles relative to the ground. Accordingly, the base 14 may include plates 16 which provide a pivot 20 for the first arm 26 and a pin 22 or other means to lock the first arm 26 at a desired angle. As shown, the plates 16 include a plurality of holes 24 which are concentric to the pivot 20 and which may be used to lock the position of the first arm 26 by passing a pin 22 through a hole 24 and a corresponding hole in the first arm 26. A pin 28 or other structure may be provided to limit the range of motion of the first arm 26. Although not easily visible in this view, a spring may be provided to support some of the weight of the puller arms and motor, making the wire puller 10 easier to operate. The spring may be a torsion spring placed about the pivot 20 and connected to the base 14 and the first arm 26.

The first arm 26 may have a notch 46 formed therein, allowing a rope (not shown) to extend around the bottom of pulley 42 (as would be the case for the overhead pull configuration shown), pass through the notch 46, and wrap around the capstan 38. Depending on the use of the wire puller 10, it may or may not be necessary for the pulling rope to cross the first arm 26. It will be appreciated that it is desirable for the rope to pass around the pulley and to the capstan 38 relatively unobstructed so as not to bind on the arms of the wire puller 10. The first arm 26 may also include a folding joint or pivot 50 near the middle thereof so as to allow the first arm 26 to be folded in half during storage or transportation to reduce the size of the wire puller 10.

The first arm 26 is constructed with plates 54 attached to the end of the first arm 26. The plates 54 typically have a pivot shaft 58 passing through the plates 54, which is used to mount the pulley 42, and which is also used to mount the second arm 62. The plates 54 are formed with series of holes 66 which are concentric with the pivot shaft 58 and used to lock the second arm 62 into a desired position by passing a pin 70 through the holes 66 and a corresponding hole in the second arm 62. As such, the second arm 62 may be locked at a desired angle relative to the first arm 26, similar to how the first arm 26 is locked at a desired angle relative to the base 14.

The second arm 62 may be formed out of telescoping sections. As such a first section 62a slidingly receives a second section 62b. As shown, the second arm 62 has two parallel sections each comprising a first section 62a and a second section 62b. Such a design works well with the joint configuration shown comprising a pulley 42 and plates 54. A series of holes 74a are formed in first section 62a, and a corresponding series of holes 74b are formed in second section 62b. The series of holes 74a, 74b may be formed at a desired interval, such as 6 inches, which allows the second arm 62 to be extended in 6 inch intervals. The second arm 62 may be locked at a desired length by passing a locking pin 78 through a first hole 74a and second hole 74b. It is appreciated that for the configuration shown, two pins 78 will pass through holes in both of the parallel sides of the second arm 62. Additionally, it is advantageous for the pin 78 to pass completely through the tubing used to make the first section 62a and second section 62b.

The free end (indicated at 82) of the second arm 62 has a pivot shaft 86 passing therethrough to which a pulley 90 is mounted. The pivot shaft 86 also serves to rotatably mount an adapter bracket 94. The adapter bracket 94 has a surface to which an adapter 98 may be mounted. The adapter 98 is typically bolted to the adapter bracket 94, but other means such as keyed slots may be suitable. The adapter bracket 94 typically has a pair of plates 102 which have a series of holes 106 concentric to the pivot shaft 86. A pin 100 is passed through a hole 106 and a corresponding hole on the second arm 62 to lock the adapter bracket 94 in a desired orientation.

The adapter 98 is typically configured to engage a conduit to thereby brace the wire puller 10 against the conduit and thus aid in pulling wire from the conduit. A foot control 114, or other control may be used with the wire puller 10. While the first pulley 42 is a relatively large diameter, such as about six to ten inches in diameter, the second pulley 90 is a smaller diameter, such as about two to four inches in diameter. The smaller pulley 90 allows the wire puller 10 to have a more compact free end, allowing the wire puller 10 to be more easily used in pulling wire from confined spaces such as electrical boxes.

Figure 2:
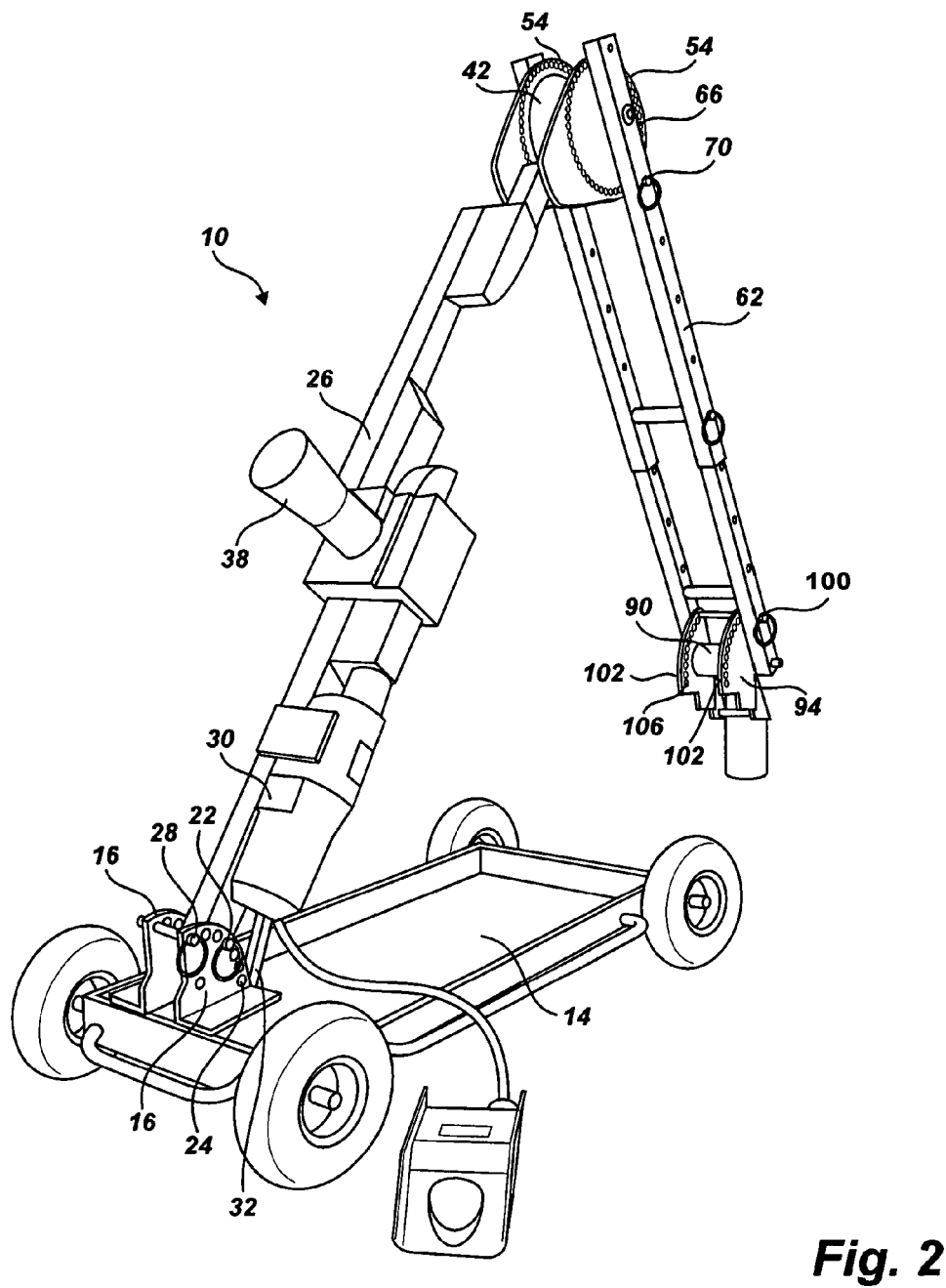
FIG. 2 shows another perspective view of the wire puller shown in FIG. 1.

Turning now to FIG. 2, another perspective view of the wire puller 10 of FIG. 1 is shown. In FIG. 2, the wire puller 10 is illustrated as being positioned for pulling a wire from the floor. It will be appreciated that, by selectively positioning the base 14, first arm 26, second arm 62, adapter bracket 94 and adapter 98 so as to direct the adapter 98 towards the conduit, and by then locking these assemblies into position with the locking pins 22, 70, 100 and with plates 16, 54, 102 and holes 24, 66, 106. Thus, the wire puller 10 is easily positioned for most if not all wire pulling jobs. Spring 32, such as a torsion spring, is used to support some or all of the weight of the first arm 26 and second arm 62 as has been discussed. While the wire puller arms 26, 62 may weigh upwards of about 200 pounds, the spring 32 may be used to support much of that weight such that an operator must lift only 50 pounds or less when positioning the wire puller arms 26, 62.

FIG. 2 also better shows the pulleys 42, 90. The pulleys 42, 90 guide the rope and wire from the conduit to the capstan 38. The distance between the adapter 98 and the capstan 38 is considerably longer than existing wire pullers (about 10 feet as compared to a few feet or less), allowing a longer length of wire to be pulled out from the conduit without requiring the stopping of the wire puller 10 to reattach the rope to the wire. This allows sufficient wire to be pulled from the conduit for connection to the desired light, outlet, switch, etc. The adapter 98, by engaging the conduit, allows for easier and more stable setup of the wire puller 10 and easier pulling of wires.

Many existing wire pullers have a single arm with a motor attached to the arm. According to various embodiments, the wire puller 10 disclosed herein has two arms pivotably mounted to each other, and pivotably mounted to a base. The first arm 26 and second arm 62 allow the wire puller 10 to be used for most situations. The arms 26, 62 may be positioned to pull wires from a ceiling, wall, floor, etc. Additionally, the two arms 26, 62 provide sufficient reach for the adapter 98 to reach and engage a conduit in a ceiling, not possible with existing wire pullers. Thus, existing wire pullers typically must be bolted to the floor or held in place by the operator, both of which may limit the force which may be exerted on the wire and the control an operator has over the wire and wire puller, as well as the ease of using the wire puller. The use of a wheeled base 14 allows the wire puller 10 to be easily moved between pulls or between jobsites. The use of an adapter 98 which attaches to a conduit secures the wire puller 10 for a pull without requiring the user to attach the base 14 to the ground or exert a high amount of force to stabilize the wire puller 10.

It is appreciated that in use, a rope or pulling line is pulled through a conduit where a wire is to be installed. A fish tape or the like may be used to aid in placing the rope in the conduit. The rope has a large enough diameter for the pulling forces involved, and is often of a large length, such as between two hundred fifty and one thousand feet long so as to accommodate installation of varying lengths of wires. The rope is placed in the conduit such that the extra coil of rope is near the wire puller 10 and the free end of the rope extends from the opposite end of the conduit, ready for attachment to the wire which is to be pulled through the conduit. The wire puller 10 and conduit adapter 98 are designed so as to allow the rope to be placed through the conduit before any interaction with the wire puller 10 or adapter 98.

The wire puller 10 and the adapter 98 are designed such that the rope (or wire) does not need to be threaded through any confined opening on the wire puller 10 or adapter 98. The rope may be placed around the wire puller pulleys 42, 90 and capstan 38 and through the adapter 98 without threading the rope through any of these parts. Thus, the rope may be first threaded through the conduit, resulting in a loose end of the rope for connection to the wire extending from the end of the conduit away from the wire puller 10 and the rope extending from the conduit back to the spool of rope near the wire puller 10. This section of rope between the conduit and the spool of rope may be easily placed into the adapter 98 and around the pulleys 42, 90 and capstan 38 to prepare for a wire pull. After the wire pull, the wire and rope may similarly be easily removed from the adapter 98 and wire puller 10 without threading it out of the same. Thus, the design of the wire puller 10 and adapter 98 allow for easy loading and unloading of the rope and wire during use.

The adapter 98 is formed with a slot through a side thereof so that any point along the rope may be placed into the bore of the adapter 98. The rope is then passed around the second pulley 90, around the first pulley 42, and is wrapped around the capstan 38 several times. The operator pulls on the end of the rope extending past the capstan 38 to tighten the winds of rope around the shaft 38 and thereby cause the rope to grip the capstan 38, causing the capstan 38 to pull on the rope and pull the desired wire through the conduit.

Prior art wire pullers require that the rope is threaded through the wire puller or conduit adapter before threading the rope through the conduit. This is cumbersome and makes it more difficult to thread the rope through the conduit. Additionally, the wire puller can not be taken or used elsewhere until the wire pull is completed, and other wire pulls can not be set up in advance without the wire puller, as the wire puller must be present to install the pulling rope prior to the wire pull.

Figure 3:
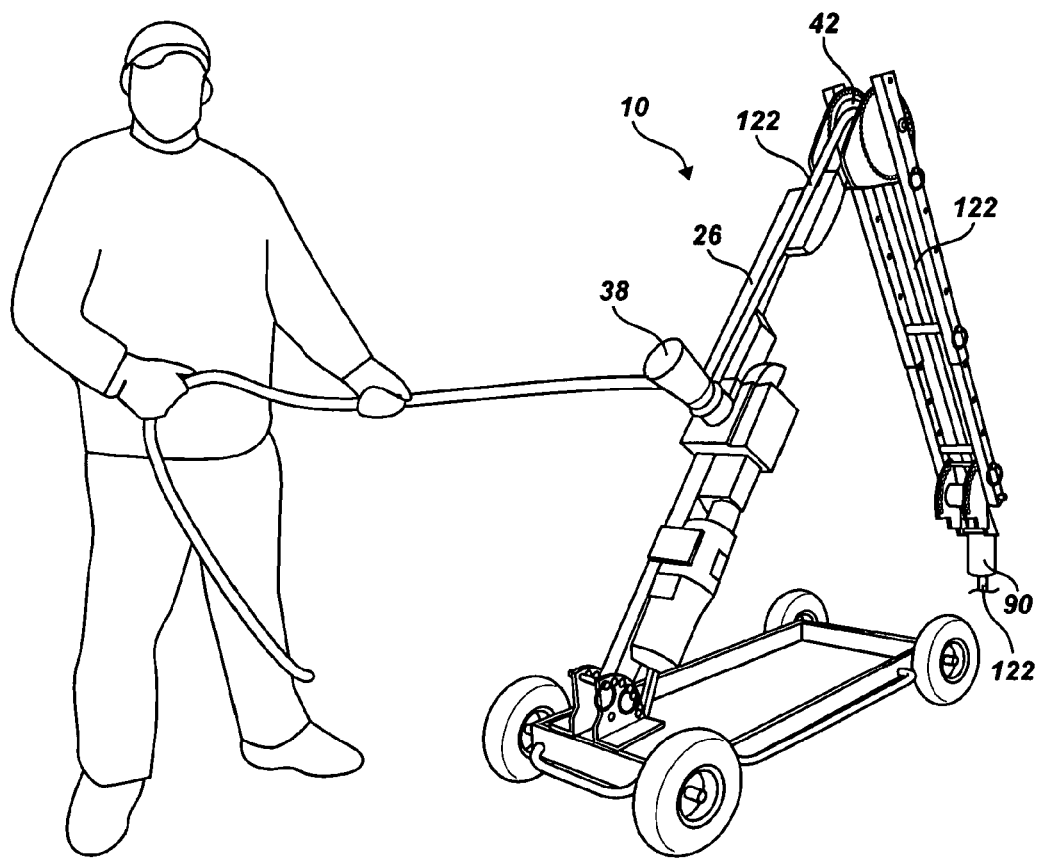
FIG. 3 shows another perspective view of the wire puller shown in FIG. 1.

Turning now to FIG. 3, another perspective view of the wire puller 10 of FIG. 1 is shown. The wire puller 10 is positioned to pull wire from a floor conduit. A pulling rope 122 is shown, and it can be seen how the rope extends through the adapter 98 and the adapter bracket 94 around pulleys 90, 42 and wraps around capstan 38. The operator may then apply moderate force to the rope 122 to cause the rope to grip the capstan 38 and allow the wire puller 10 to pull the rope 122 and wire through a conduit.

It will be appreciated that if the rope were to break, such as in the conduit or near the conduit opening, the broken end of the rope 122 which is wrapped around the pulleys 42, 90 would recoil towards the capstan 38. The rope used 122 is often a polyester rope or the like, and will stretch slightly and store tremendous amounts of energy in the rope. If an operator was standing behind the wire puller 10 when the rope 122 broke, the rope could impact the operator with tremendous force and cause serious injury. The placement of the capstan 38 in a vertical position (extending generally perpendicularly from the top of the first arm 26) allows the operator to stand to the side of the wire puller where they are less likely to be hit by a broken wire pulling rope.

Figure 4:
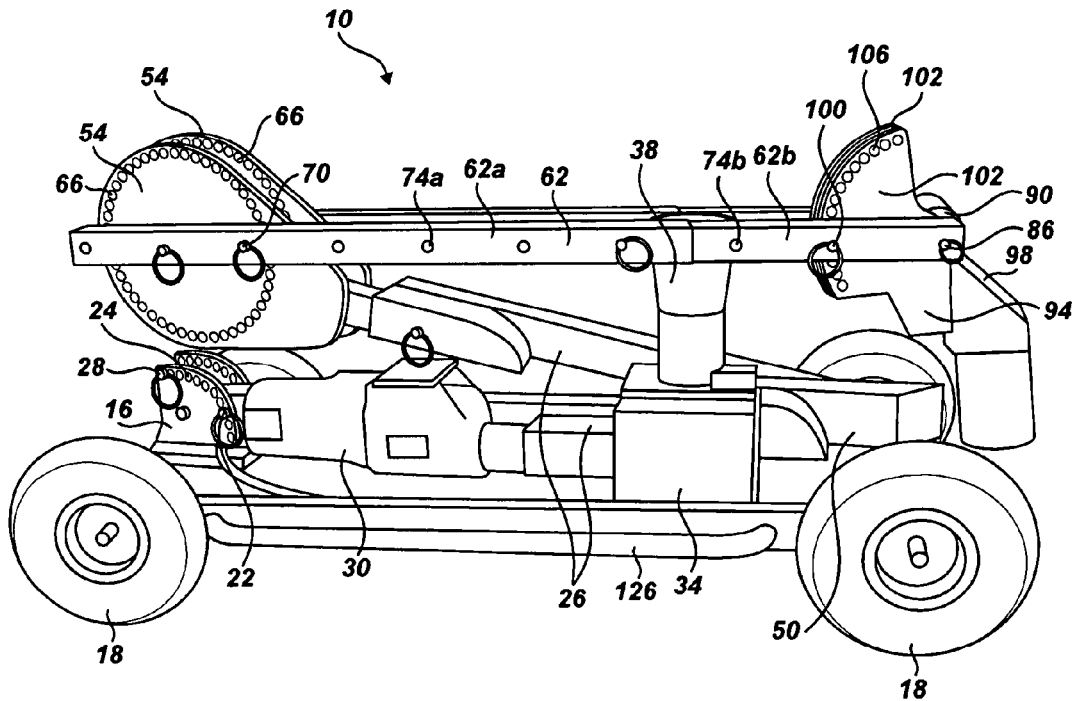
FIG. 4 shows another perspective view of the wire puller shown in FIG. 1.

Turning now to FIG. 4, another perspective view of the wire puller 10 of FIG. 1 is shown. The wire puller 10 is folded for transportation or storage. It can be observed how the telescoping second arm 62 can be shortened, and how a folding joint or pivot 50 in the first arm 26 allows for convenient transportation and storage of the wire puller 10. The pivot 50 may use a pin, bolt, or other suitable device to lock the arm 26 into an extended or folded position as is desired. The wire puller may be provided with handles 126 to allow for easier transportation of the wire puller.

FIG. 4 also shows more clearly the locking pins 22, 28, 70, 100, plates 16, 54, 102, and holes 24, 66, 106, which allow for positioning of the first arm 26 and second arm 62. The pivot 86 for plates 102 and pulley 90 may be a removable pin, allowing the plates and adapter 98 to be easily removed and reversed for an overhead versus underground wire pull. Easily reversible plates 102 and adapter 98 allows the plates 102 to accommodate approximately 90 degrees rotation (via indexing holes 106) of the adapter (about pivot 86) and still allow a full range of overhead and underground pull setups. Where the plates 102 and adapter 98 can not be easily reversed, the plates 102 must accommodate approximately 180 degrees of rotation to allow for a full range of overhead and underground wire pulls. The use of smaller plates 102, in combination with a smaller diameter pulley 90, allow for easier use in confined areas such as electrical boxes.

Figure 5:
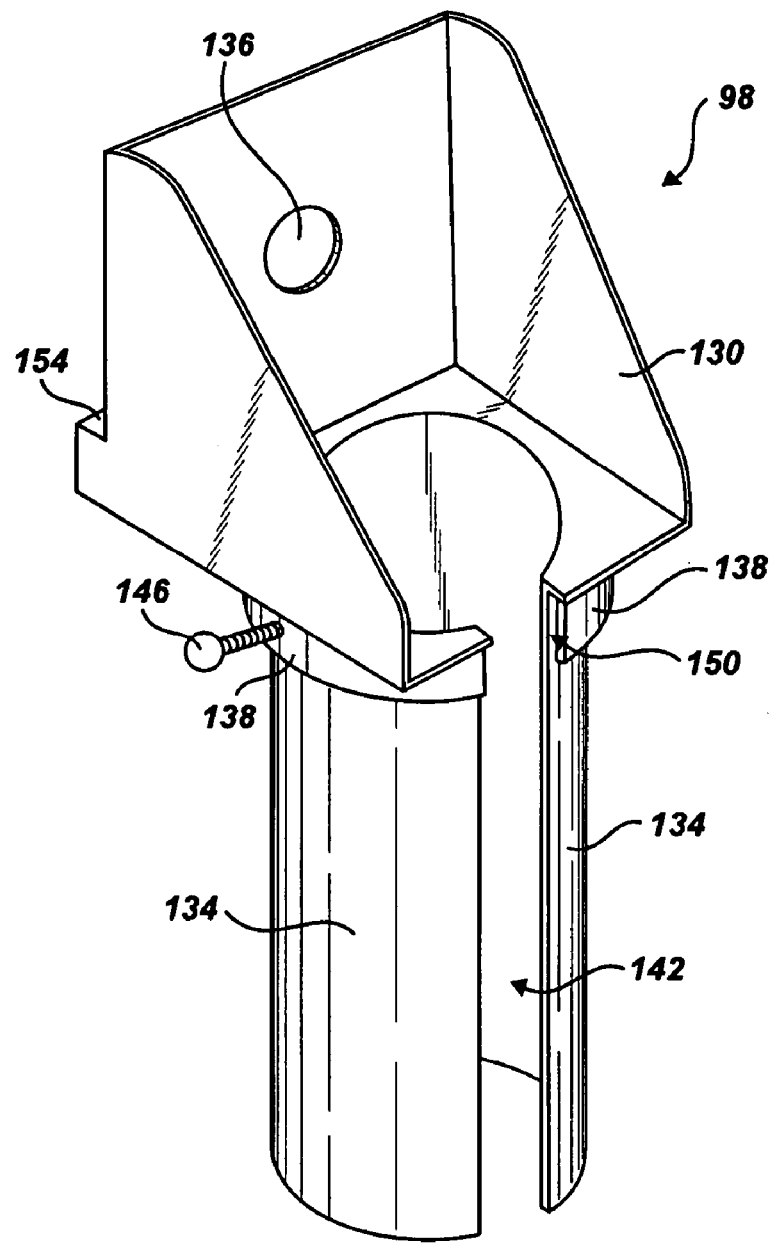
FIG. 5 shows a perspective view of the conduit adapter shown in FIGS. 1-4.

Turning now to FIG. 5, a perspective view of the adapter 98 of FIG. 1 is shown. The adapter 98 includes a body 130 and a tube 134 attached to the body 130. The tube 134 is placed in a conduit to brace and secure the wire puller 10 when in use. The tension placed on the rope/wire when the wire puller 10 is in use will hold the adapter 98 in the conduit, so it may not always be necessary to secure the adapter 98 to the conduit with a bolt or the like. A collar 138 may also be attached to the body 130 concentric to the tube 134. The tube 134 is open to the body 130 so that a rope or wire may pass through the bore of the tube 134. A slot 142 is formed in the tube 134 and body 130 to allow a rope to be placed in the tube 134 without threading the rope through the tube 134. This is useful, as the rope or wire being pulled is often fairly long, and the slot 142 eliminates the need to thread the pulling rope through the adapter 98 before threading the rope through the conduit, making it easier to use the wire puller 10. A space 150 may be formed between the tube 134 and collar 138, and the adapter 98 may be used by placing the tube 134 inside of a conduit until the end of the conduit occupies the space 150 between the tube 134 and collar 138. A thumb screw 146 may be used to secure the adapter 98 to the conduit. The adapter 98 is typically bolted to the adapter bracket 94 (FIGS. 1-4), and as such may include a hole 136, threaded hole, threaded shaft, etc. to facilitate attachment to the adapter bracket 94. A ledge 154 may be formed on the adapter 98 to aid in securing the adapter 98 to an adapter bracket 94.

As will be shown in subsequent figures, the tube 134 may be removable from the body 130 to allow different sizes of tubes to be attached to the body 130, or to allow the body 130 to be attached to fittings or threaded conduit. The inside of collar 138 may be threaded to allow the body 130 (without the tube 134) to be threaded onto a threaded fitting or conduit to brace the adapter 98 and wire puller 10 for a wire pull.

Figure 6:
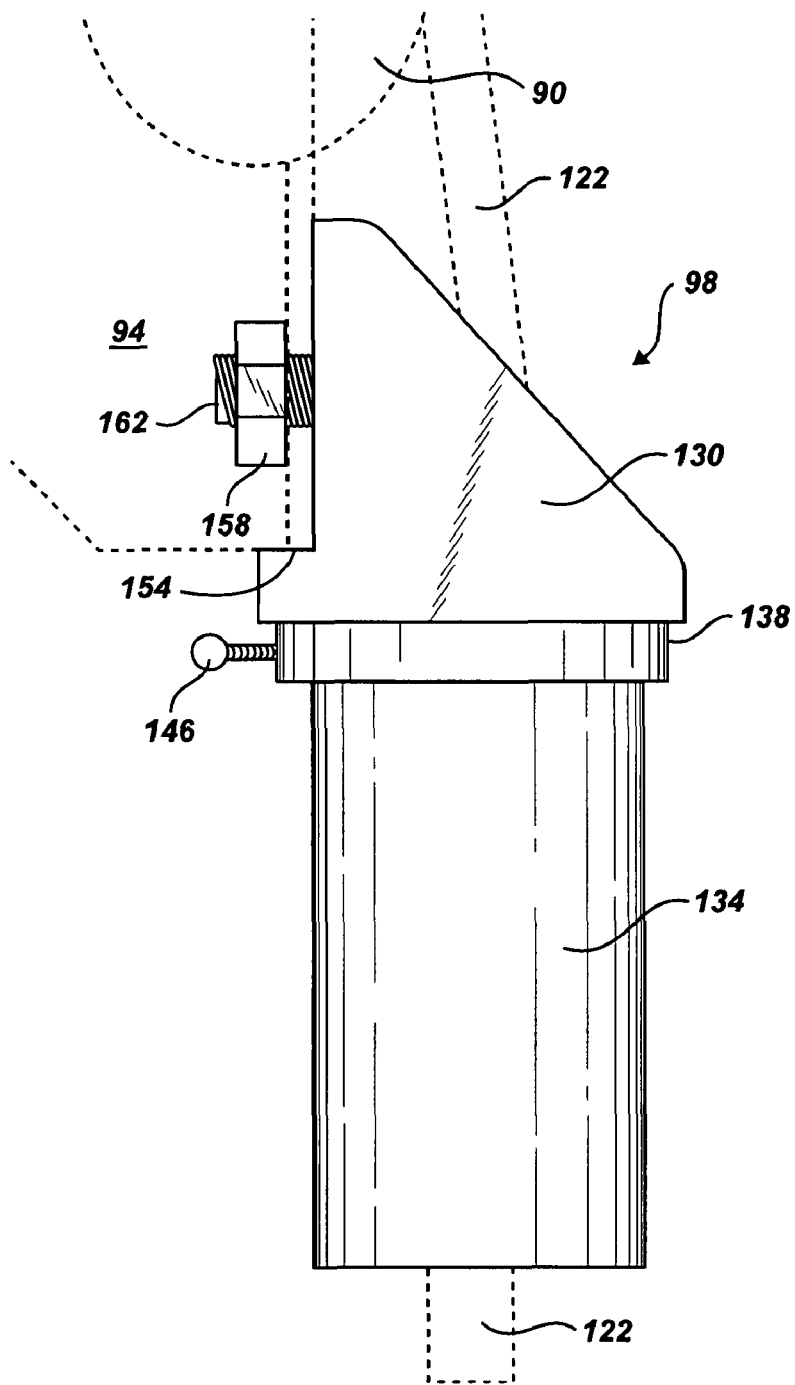
FIG. 6 shows a side view of the conduit adapter attached to the wire puller.

Turning now to FIG. 6, a side view of the adapter 98 according to some embodiments of the concepts and technologies disclosed herein is shown. The adapter 98 is attached to the adapter bracket 94, and typically includes a body 130 and a section of tube 134 as has been discussed. The body 130 is typically attached to the adapter bracket 94 by a nut 158 and bolt 162 (or threaded rod), or may be keyed or otherwise attached to the adapter bracket 94. The tube 134 is sized to fit inside of standard sizes of conduit. Thus, a set of adapters 98 may be made with different sizes of tubes 134, which fit inside of different sizes of conduit, such as 1 inch through 8 inch conduits, etc. Alternatively, the tube 134 may be removable from the body 130 and a number of differently sized tubes 134 may be alternatively attached to the body 130 as is desired. It is advantageous, though not necessary, that the adapter 98 is easily attached to and removed from the adapter bracket 94 to allow an operator to easily change the adapter 98, or to allow the adapter 98 to be removed for easier attachment to a conduit.

Sliding the tube 134 inside of a conduit will help in securing the adapter 98 to the conduit, and will especially aid in preventing lateral movement away from the conduit or pivoting away from the axis of the conduit. Thus the adapter 98 adds to the overall strength and stability of the wire puller 10. The shoulder 154 may be used to engage the adapter bracket 94 to maintain a desired alignment between the wire puller 10 and the adapter 98.

As rope 122 is typically used to pull wire, the adapter 98 is typically designed such that a rope 122 will pass through the adapter 98 (typically requiring a hole in the body 130 in alignment with the tube 134) and operatively engage the wire puller 10. The adapter 98 has the slot 142 formed therein to allow the rope to be located in the bore of the tube 134 without requiring the rope to be threaded through the tube 134.

Figure 7:
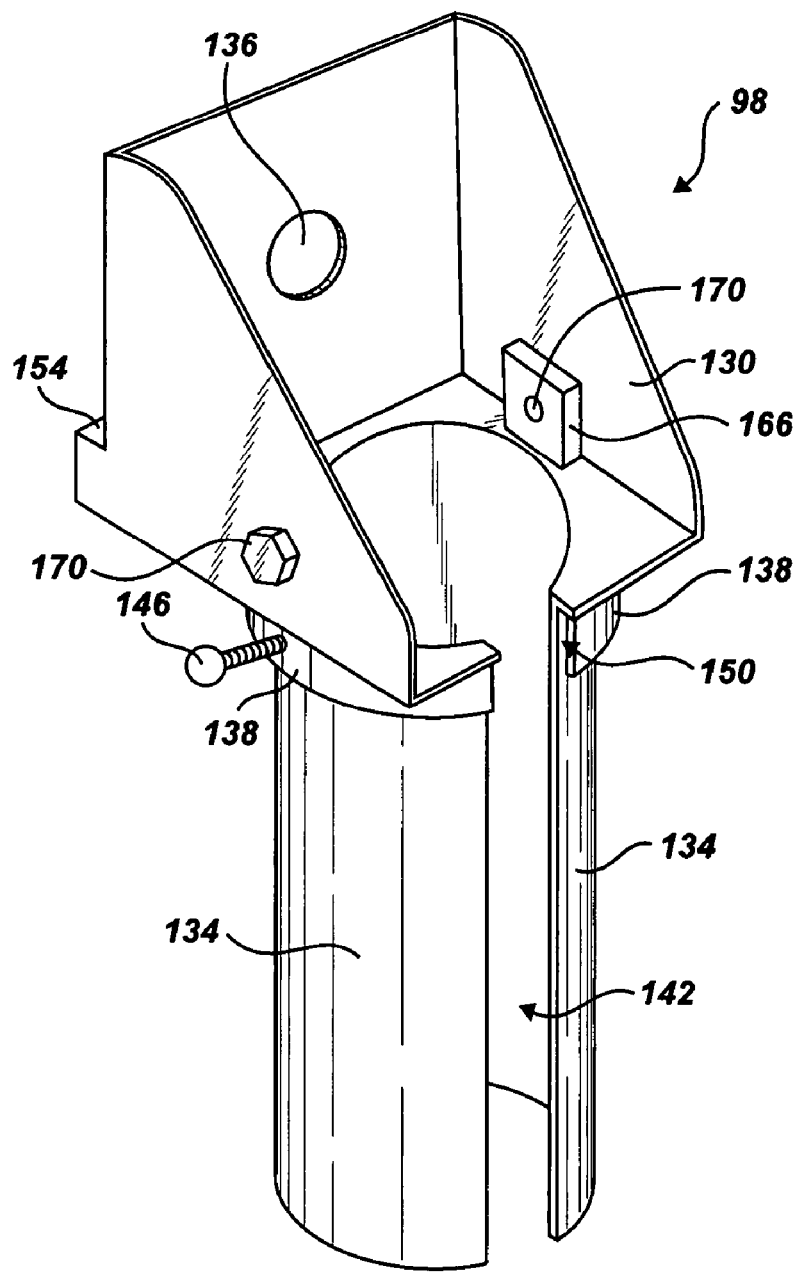
FIG. 7 shows another perspective view of the conduit adapter, according to an illustrative embodiment.

Turning now to FIG. 7, another perspective view of the adapter 98 is shown. The adapter 98 is attached to the wire puller 10 and functions as previously described. The adapter 98 includes a body 130 which is attached to the wire puller 10 and tube 134 which is inserted into a conduit. The tube 134 is removably attached to the body 130. The tube 134 has a pair of flanges 166, which are attached to the sides of the body 130 by bolts 170. The tube 134 may be removed from the body 130 by removing bolts 170 and sliding the tube 134 downwardly from the body 130. Removal of the tube 134 facilitates insertion of the tube 134 into a conduit where there is insufficient space for inserting the tube 134 while it is attached to the body. The tube 134 may also be removed from the body 130 to change the tube size for use with different sizes of conduit. The adapter 98 may include a collar 138, a mounting hole 136, a ledge 154, a thumb screw 146, if desired.

Figure 8:
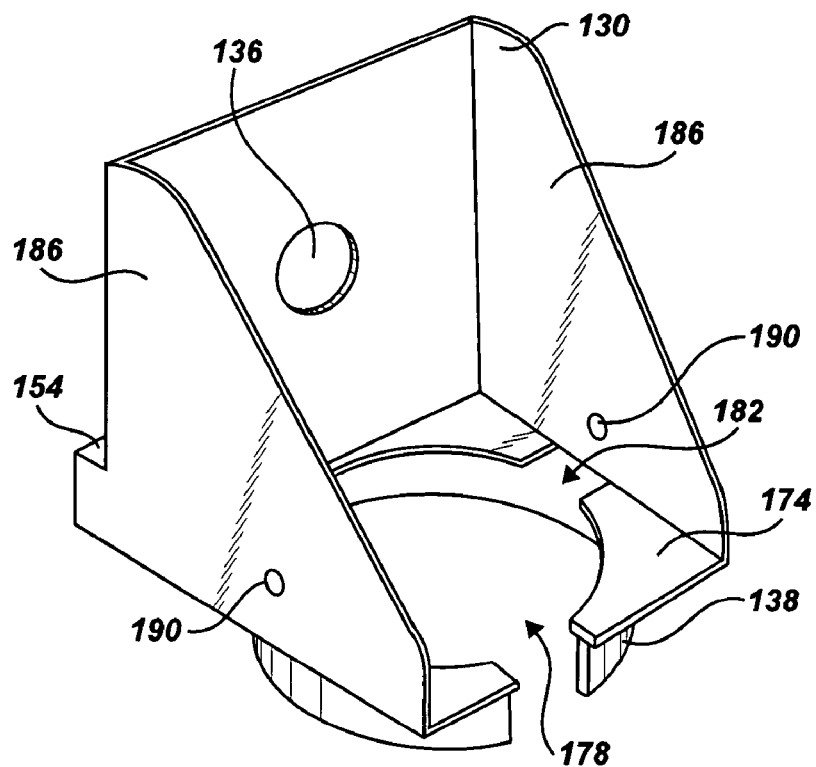
FIG. 8 shows a perspective view of the body of the conduit adapter of FIG. 7.
Figure 9:
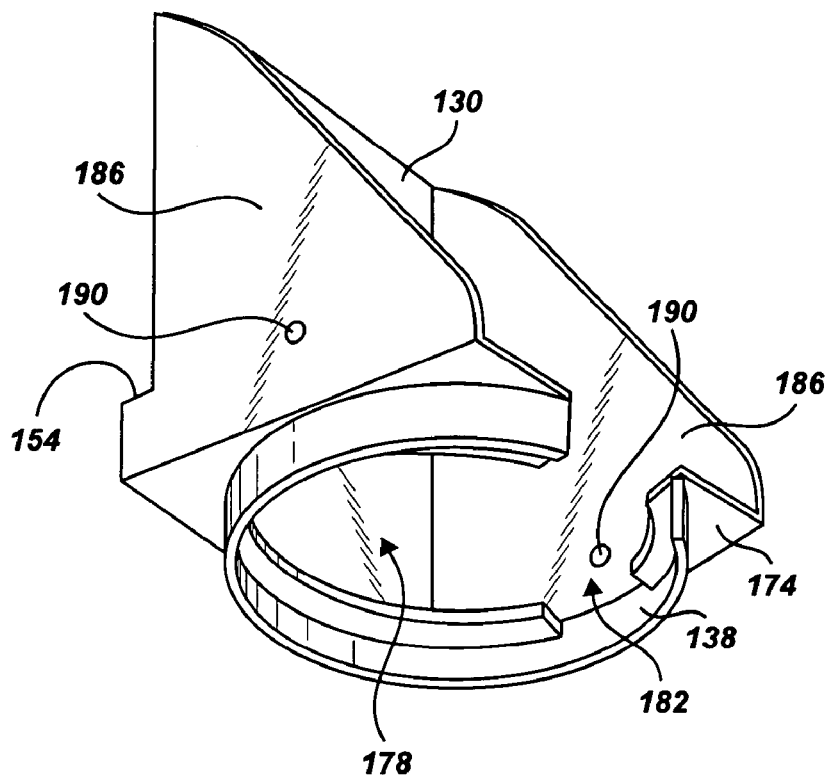
FIG. 9 shows another perspective view of the body of the conduit adapter of FIG. 7.

FIG. 8 and FIG. 9 show top and bottom perspective views of the body 130 of the adapter 98. The base 174 of the body 130 includes an opening 178 through which a rope and cable passes when in use. The opening 178 is formed with a pair of recesses 182 (one on either side, only one is visible in either view) which receive the flanges 166. The sides 186 of the body 130 are formed with holes 190 which are used to fasten the tube 134 to the body 130.

Figure 10:
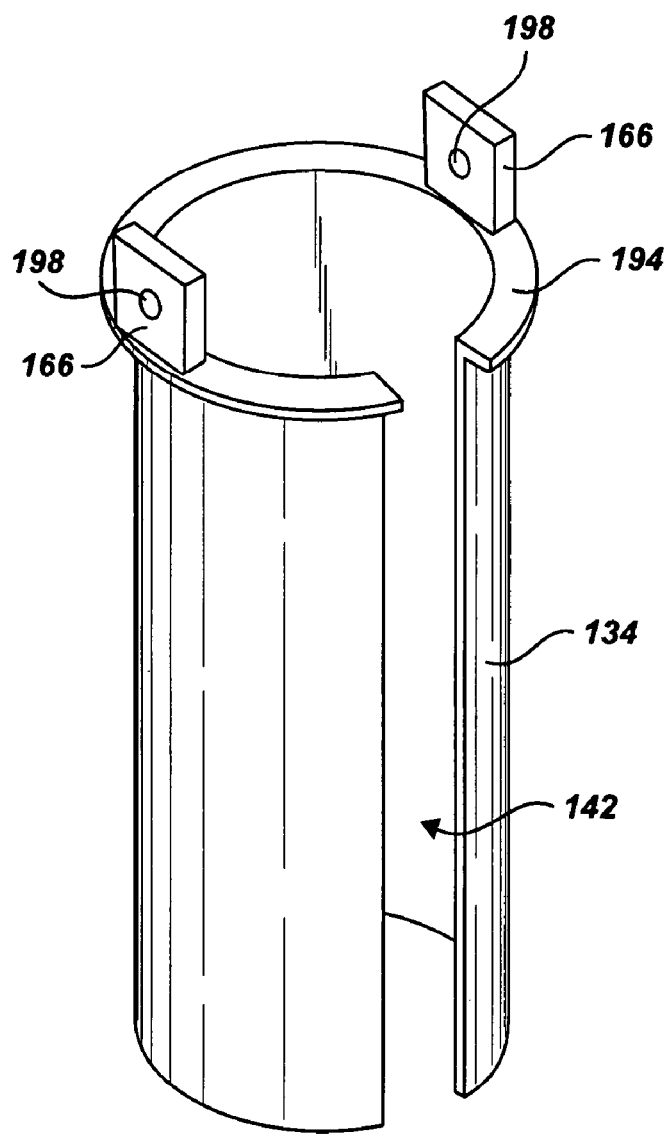
FIG. 10 shows a perspective view of the tube of the conduit adapter of FIG. 7.
Figure 11:
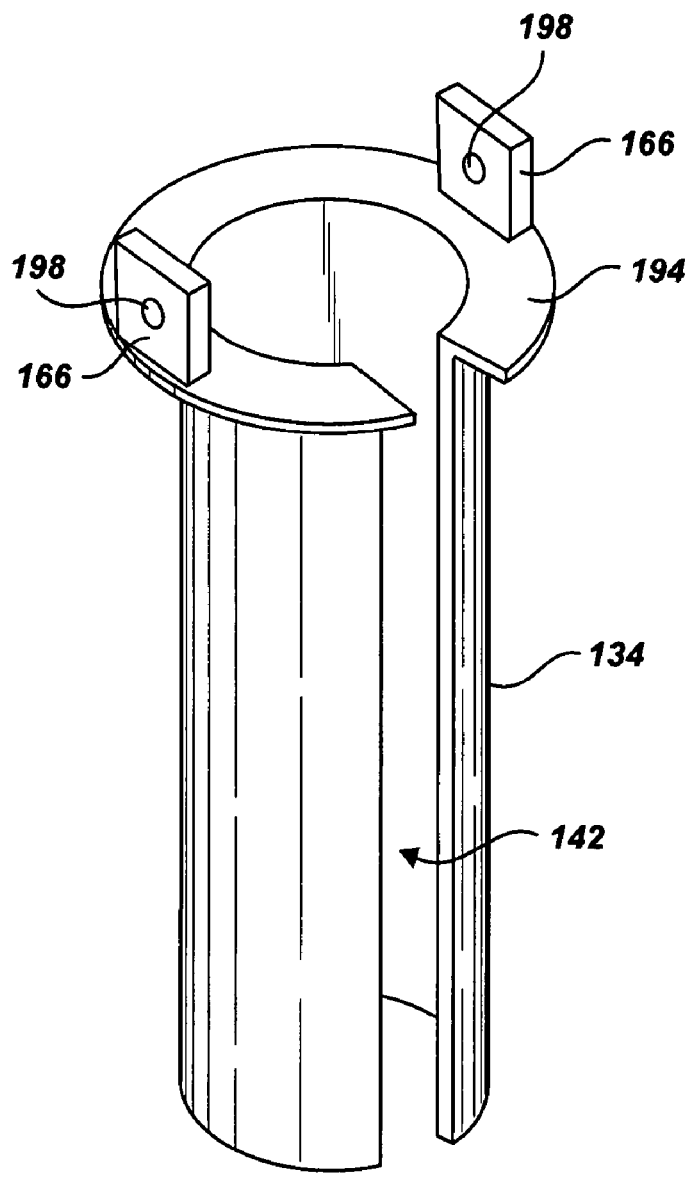
FIG. 11 shows another perspective view of the tube of the conduit adapter of FIG. 7.

FIG. 10 and FIG. 11 show perspective views of the tube 134. The tube 134 of FIG. 11 is smaller than that of FIG. 10 and is for use with a smaller size of conduit. The tube 134 is attached to a C-shaped plate 194 which has an outer diameter which engages the body 130 and an inner diameter approximately the same as the bore of the tube 134. A slot 142 is formed in the tube 134 and plate 194 to allow the tube 134 to be placed over a rope which is already inserted into a conduit. The plate 194 has flanges 166 protruding therefrom. The flanges 166 have holes 198 formed therethrough. The holes 198 line up with holes 190 in the body 130 when the tube 134 is properly inserted into the body, and bolts 170 are placed therethrough to fasten the tube 134 to the body.

The conduit adapter shown in FIGS. 7-11 provides removable tubes 134 which may be changed to provide different sizes of tubes to accommodate different sizes of conduits, and which may be removed to facilitate use where limited space is available. Where an electrical box or other obstruction restricts the room around a conduit, the tube 134 may be inserted into the conduit, the body 130 fastened to the tube 134, and the wire puller 10 fastened to the body 130 of the adapter 98.

There is thus disclosed an improved wire puller. It will be appreciated that numerous changes may be made to the various embodiments of the concepts and technologies disclosed herein without departing from the scope of the claims.

We claim:

1. A wire puller comprising:
    a base;
    a first arm extending along a length and having a first end and a second end, the first end being pivotably connected to the base at a first pivot;
    a capstan extending from the first arm in a direction substantially perpendicular to the length, the capstan being configured to pull a rope or a wire contacting the capstan as the capstan rotates;
    a motor operatively coupled to the capstan and configured to rotate the capstan;

a second arm having a first end and a second end, the first end being pivotably connected to the second end of the first arm at a second pivot; and a conduit adapter at the second end of the second arm, wherein the first arm further comprises a notch formed in the first arm between the capstan and the second end of the first arm, and wherein the rope or the wire passes through the notch unobstructed by the first arm when the wire puller is configured for an overhead wire pull.

2. The wire puller of claim 1, wherein the first arm comprises an arm pivot to allow selective bending of the first arm at the arm pivot.

3. The wire puller of claim 1, wherein the second arm comprises telescoping arm sections configured to vary the length of the second arm.

4. The wire puller of claim 3, wherein the second arm may be selectively locked at a desired length.

5. The wire puller of claim 1, wherein the base comprises at least one plate having a plurality of holes arranged radially about the first pivot, and wherein the first arm has a corresponding hole to allow a pin to be placed therethrough to lock the first arm at a desired angle relative to the base.

6. The wire puller of claim 1, wherein the second arm may be selectively locked at a desired angle relative to the first arm.

7. The wire puller of claim 6, wherein the second end of the first arm comprises at least one plate having a plurality of holes arranged radially about the second pivot and wherein the second arm has a corresponding hole to thereby allow a pin to be placed therethrough to lock the second arm at a desired angle relative to the first arm.

8. The wire puller of claim 1, wherein the conduit adapter is removably connected to the second end of the second arm.

9. The wire puller of claim 1, wherein the conduit adapter further comprises a body and a tube, the tube being configured for placement inside of a conduit.

10. The wire puller of claim 1, further comprising a first pulley disposed at the second pivot, and a second pulley disposed at the second end of the second arm.

11. The wire puller of claim 9, wherein the tube comprises a bore and the conduit adapter is configured to:
be selectively removed from the second arm;
rotated with respect to a center point of the bore; and
reconnected to the wire puller to selectively configure the wire puller for overhead and underground wire pulls.

12. The wire puller of claim 10, wherein the wire puller is configured to pull a rope without requiring threading of the rope through any of the conduit adapter, the first pulley, the second pulley, and the capstan.

13. The wire puller of claim 1, further comprising an adapter bracket, and wherein:
the second end of the second arm comprises a third pivot point; and
the conduit adapter is removably connected to the adapter bracket, and wherein the adapter bracket is pivotably mounted to the second arm at the third pivot point.

14. The wire puller of claim 13, wherein the adapter bracket comprises at least one plate pivotably mounted at the third pivot point, the at least one plate having a plurality of holes arranged radially about the third pivot point such that the adapter bracket may be selectively locked at a desired angle relative to the second arm.

15. The wire puller of claim 1, further comprising a spring disposed adjacent the first pivot so as to partially support the weight of the first arm and second arm.

16. A wire puller comprising:
a base;
a first arm extending along a length and having a first end and a second end, the first end being connected to the base at a first pivot;
a capstan extending from the first arm in a direction substantially perpendicular to the length, the capstan being configured to pull a rope or wire wrapped around the capstan as the capstan rotates, wherein at least a portion of the capstan is knurled;
a motor configured to rotate the capstan;
a second arm having a first end and a second end, the first end of the second arm being pivotably connected to the second end of the first arm at a second pivot, wherein the second arm comprises a plurality of telescoping portions for varying the length of the second arm;
a conduit adapter rotatably connected to the second arm at the second end of the second arm at a third pivot;
a notch formed in the first arm between the capstan and the second end of the first arm, wherein the notch is configured for passage of the rope or the wire through the notch unobstructed by the first arm when the wire puller is configured for an overhead wire pull;
a first pulley disposed at the second pivot; and
a second pulley disposed at the second end of the second arm, wherein a rotational axis of the second pulley is the third pivot.

17. A wire puller comprising:
a base;
a first arm extending along a length and having a first end and a second end, the first end being connected to the base at a first pivot;
a capstan extending from the first arm in a direction substantially perpendicular to the length, the capstan being configured to pull a rope or wire wrapped around the capstan as the capstan rotates, wherein at least a portion of the capstan is knurled;
a motor configured to rotate the capstan;
a second arm having a first end and a second end, the first end being pivotably connected to the second end of the first arm at a second pivot, wherein the second arm comprises a plurality of telescoping portions for varying the length of the second arm;
a conduit adapter at the second end of the second arm; and
a notch formed in the first arm between the capstan and the second end of the first arm, wherein the notch is configured for passage of the rope or the wire through the notch unobstructed by the first arm when the wire puller is configured for an overhead wire pull.

18. The wire puller of claim 17, further comprising a first pulley disposed at the second pivot, and a second pulley disposed at the second end of the second arm.

19. The wire puller of claim 18, wherein the conduit adapter is rotatably connected to the second arm at the second end of the second arm at a third pivot that comprises a rotational axis of the second pulley.

* * * * *